D. O. ROYSTER.
METHOD OF AND APPARATUS FOR SYNCHRONOUSLY MAKING MOTION PICTURES AND SOUND RECORDS.
APPLICATION FILED MAR. 16, 1914.
1,293,203.
Patented Feb. 4, 1919.
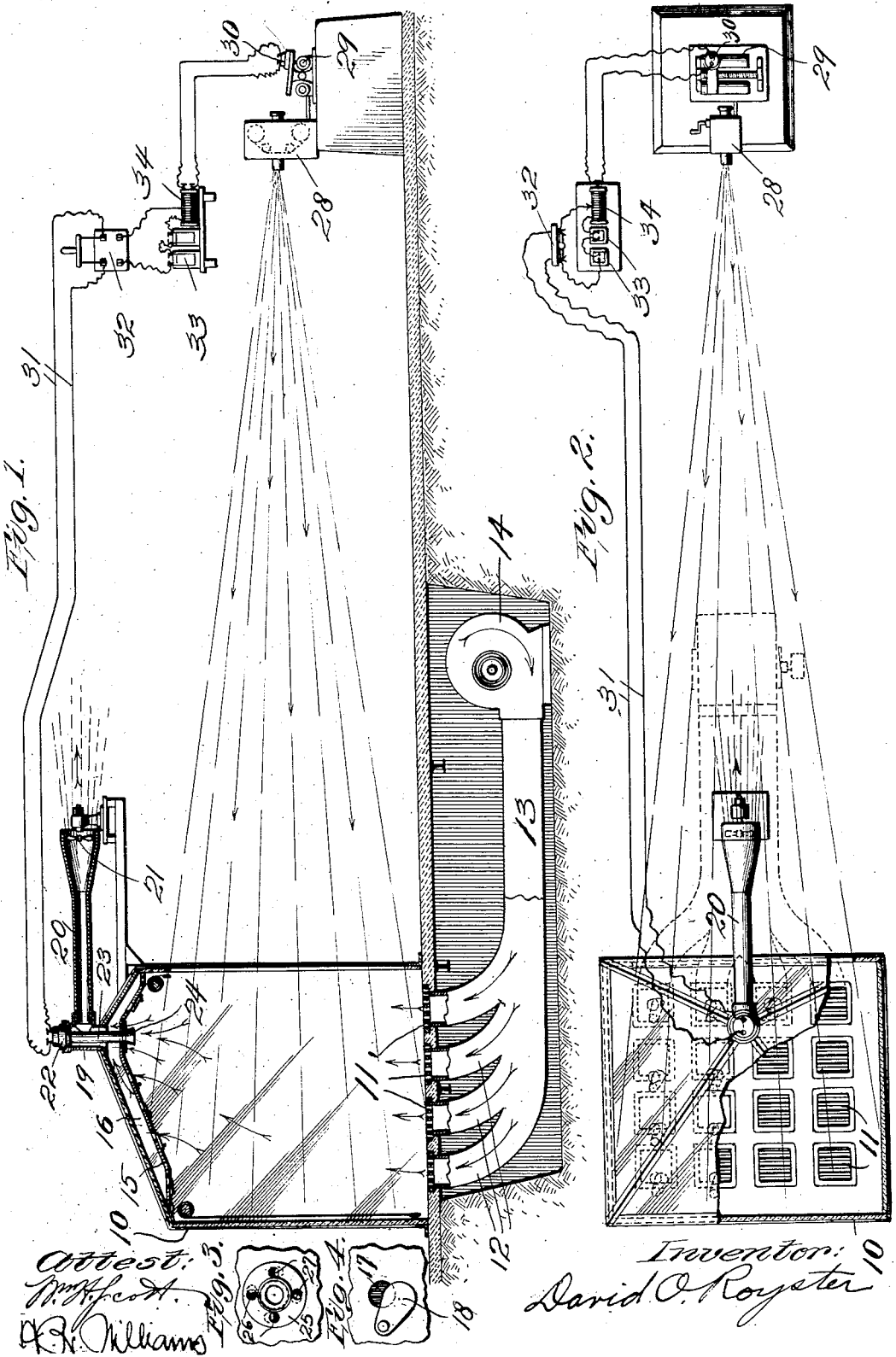

UNITED STATES PATENT OFFICE.

DAVID O. ROYSTER, OF ST. LOUIS, MISSOURI.

METHOD OF AND APPARATUS FOR SYNCHRONOUSLY MAKING MOTION-PICTURES AND SOUND-RECORDS.

1,293,203.

Specification of Letters Patent.  Patented Feb. 4, 1919.

Application filed March 16, 1914. Serial No. 824,894.

*To all whom it may concern:*

Be it known that I, DAVID O. ROYSTER, a citizen of the United States, residing at St. Louis, Missouri, have invented a certain new and useful Improvement in Methods of and Apparatus for Synchronously Making Motion-Pictures and Sound-Records, of which the following is a full, clear, and exact description, such as will enable others skilled in the art to which it appertains to make and use the same, reference being had to the accompanying drawings, in which—

Figure 1 is a diagrammatic view with parts in section of an apparatus of my improved construction.

Fig. 2 is a plan view of the apparatus with parts thereof in section.

Fig. 3 is a detail view of a valve which surrounds the neck of the sound receiver of my improved apparatus.

Fig. 4 is a detail view of a valve such as is utilized in the upper portion of the structure in which the object to be photographed is located.

My invention relates to a new and improved method of and apparatus for synchronously making motion pictures and sound records, the principal object of my invention being to provide a comparatively simple inexpensive apparatus with which absolute synchronous motion pictures and sound records can be readily produced.

Heretofore it has been practically impossible to make motion pictures and sound records which bear synchronous relation to each other when reproduced for the reason that the camera for taking the motion pictures must necessarily be located a certain distance away from the object to be photographed, and where a sound recording device is located adjacent to the camera in order to be operated synchronously therewith, the distance between the receiver of the sound recording device and the object being photographed, is such that the sound waves in traveling from the object to the sound recording device do not reach the latter for an appreciable length of time, and as a result the recorded sounds are not synchronous with the pictures when said sounds and pictures are later reproduced. Furthermore, the sound waves are insufficient to make a clear and strong record on the disk or cylinder of the recording apparatus.

A further object of my invention is to provide a transparent structure to be occupied by the photographed object, thereby enabling motion pictures to be made by natural light and at the same time providing means for concentrating the sounds produced by the object, and which sounds are electrically transmitted to the sound recording device which is located adjacent to and operated synchronously with the motion picture camera.

With the above and other objects in view, my invention consists in certain novel features of construction and arrangement of parts hereinafter more fully described and claimed.

Referring by numerals to the accompanying drawings, 10 designates a structure preferably in the form of a small house, the front of which is open, and the side walls, rear wall, and top or roof of said structure are all formed of glass or other transparent material in order that the object within said structure can be photographed by natural light.

Arranged beneath this structure or in the floor thereof is a series of grids 11, and leading thereto are branch pipes 12 from a main pipe 13, which latter is connected to a suitable blower 14. The top of the structure is provided with an auxiliary ceiling 15 of glass or analogous transparent material, thus forming a chamber 16 in the top of the structure.

Formed in the inner ceiling is a series of openings 17 which are adapted to be closed by means of pivoted plates 18. Leading from the apex of the roof or top of the structure is a vertically disposed tube 19 and leading therefrom is a horizontally disposed tube 20 in the outer end of which is located a small suction fan 21.

Located at the upper end of tube 19 is a telephonic receiver 22 and leading therefrom downwardly to a point beneath the auxiliary ceiling 15 is a tube 23 provided at its lower end with a mouth piece 24.

A rotating valve 25 is located on the lower portion of this tube 23, said valve being provided with openings 26 which are adapted to register with corresponding openings 27 in the ceiling 15. Located a suitable distance in front of the structure, thus formed, is a motion picture camera 28 and a sound recording device 29, the same being connected to operate synchronously.

The sound recording device is provided with a reproducer 30. Leading from the reproducer 30 to the transmitter 22 are conductors 31 which form a circuit between said reproducer and transmitter, and located in this circuit is a suitable switch 32, a battery 33, and induction coil 34.

To synchronously make motion pictures and record sounds by my improved method and with my improved apparatus, the switch 32 is closed, the camera 28 and recording device 29 are synchronously operated and blower 14 and suction fan 21 are operated.

The object of which records are to be made occupies the structure 10 and all movements of said object will be recorded photographically upon the film which is passing through the camera 28. At the same time the sounds made by the object will be carried upward through the structure by reason of the air blown thereinto by means of the blower 14, and which air carrying the sound waves is drawn upward into upward portion of the structure by suction fan 21.

The sounds thus concentrated enter the mouth piece 24, thence pass upward through tube 23 to the receiver 22 and said sounds are telephonically transmitted to the reproducer 30 of the sound recording device.

The concentration of the sounds in the upper portion of the structure can be readily regulated by manipulating the rotary valve 25 which surrounds the mouth piece of the receiving tube 23, and also by manipulating the valves 18 which, when shifted to partially open the apertures 17 permits a portion of the sound to enter the chamber 16 and to be carried through tubes 19 and 20.

An apparatus of my improved construction is comparatively simple, can be easily operated, does not require artificial light, and motion pictures and sound records of absolute synchronism can be readily made at any distance from the object within the focal length of the camera.

It will be readily understood that minor changes in the size, form and construction of the various parts of my improved apparatus can be made and substituted for those herein shown and described, without departing from the spirit of my invention, the scope of which is set forth in the appended claims.

It will be understood that where natural light is not strong enough for the taking of pictures that the housing 10 can be lighted artificially.

I claim:

1. The hereindescribed method of synchronously making motion pictures and sound records consisting in synchronously operating a motion picture camera and a sound recording device, focusing the camera upon an object within a hollow structure, causing a current of air to pass through said structure to carry the sounds made by the object to a common point, and electrically transmitting said sounds from the point of concentration to the sound recording device.

2. The hereindescribed method of synchronously making motion pictures and sound records consisting in synchronously operating a motion picture camera and sound recording device, focusing the camera upon an object within a housing located a distance from said camera, concentrating by air pressure the sound waves produced within the housing at a common point, and electrically transmitting the sounds from the point of concentration to the sound recording device.

3. In an apparatus of the class described, a housing, a motion picture camera adapted to be focused upon an object within the housing, a sound recording device located a distance from said housing, a telephonic receiver located within the housing, means for concentrating sound waves produced within the housing at or near the telephonic receiver, and electrical connections from said receiver to the reproducer of the recording device.

4. In an apparatus of the class described, a housing, a motion picture camera and a sound recording device, located a distance from said housing, a telephonic receiver located within the housing, electrical connections from said receiver to the reproducer of the recording device, and means for forcing air through the housing to concentrate the sound waves at a point adjacent to the receiver.

5. In an apparatus of the class described, a housing adapted to be occupied by the object to be photographed, the walls and top of which housing are transparent, a sound receiving means extending into said housing, a motion picture camera located a distance away from said housing, a phonograph adjacent to the camera, and means for electrically transmitting the sound waves received by the sound receiving means to said phonograph.

6. In an apparatus of the class described, a housing adapted to be occupied by the object to be photographed, the walls and top of which housing are transparent, a telephonic receiver arranged in the housing, and means for producing a current of air through said housing to concentrate the sounds produced therein at a point adjacent to the receiver.

7. In an apparatus of the class described, a transparent housing adapted to receive the object to be photographed, means for concentrating the sound waves produced in said housing at a common point, a camera located a distance from the housing and adapted to be focused upon an object within the housing, a sound recording device located adjacent to the camera, and means for electrically transmitting the sound waves from the housing to the sound recording device.

8. In an apparatus of the class described, the combination with an inclosed structure, of means for creating a current of air through said structure, sound receiving means in said structure, a motion picture machine and a phonograph located a distance away from said structure, electrical connections between the phonograph and the sound receiving means, and means in said electrical connections for amplifying the sound waves passing through said connections.

9. In an apparatus of the class described, the combination with a housing, of a motion picture machine and a phonograph located a distance from said housing, electrical connections from the phonograph to the housing, a telephonic receiver, and reproducer located in said electrical connections, said telephonic receiver being disposed within the housing and the reproducer disposed adjacent to the motion picture machine, means for creating a current of air through the housing toward the telephonic receiver and means for controlling said current of air.

In testimony whereof I hereunto affix my signature, in the presence of two witnesses, this 12th day of March, 1914.

DAVID O. ROYSTER.

Witnesses:
Wm. H. Scott,
A. B. Lewis.